(12) United States Patent
Fujimori

(10) Patent No.: US 6,623,129 B2
(45) Date of Patent: Sep. 23, 2003

(54) OPTICAL COMPONENT AND PROJECTOR USING THE SAME

(75) Inventor: Motoyuki Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/098,395

(22) Filed: Mar. 18, 2002

(65) Prior Publication Data

US 2002/0140907 A1 Oct. 3, 2002

(30) Foreign Application Priority Data

Mar. 27, 2001 (JP) ........................ 2001-090222

(51) Int. Cl.[7] ................ G03B 21/00; G03B 21/14; G03B 21/18; G02F 1/03; G02F 1/07
(52) U.S. Cl. ............ 353/122; 353/20; 353/30; 353/31; 353/57; 353/61; 357/244; 349/5
(58) Field of Search ............... 359/240, 244, 359/248; 349/5, 7, 8, 9; 353/20, 30, 31, 61, 52, 57, 122

(56) References Cited

U.S. PATENT DOCUMENTS

| | | | |
|---|---|---|---|
| 5,184,224 A | * | 2/1993 | Mitani et al. .......... 358/231 |
| 6,359,732 B1 | * | 3/2002 | Yoshimura .......... 359/460 |
| 6,447,123 B2 | * | 9/2002 | Tonar et al. .......... 359/604 |
| 2002/0018153 A1 | * | 2/2002 | Kitabayashi .......... 349/40 |

FOREIGN PATENT DOCUMENTS

| | | | |
|---|---|---|---|
| JP | A 9-252185 | 9/1997 | ........ H05K/5/02 |
| JP | A 11-23838 | 1/1999 | ........ G02B/5/28 |
| JP | A 2000-304917 | 11/2000 | ........ G02B/5/28 |

* cited by examiner

*Primary Examiner*—Russell Adams
*Assistant Examiner*—Melissa J Koval
(74) *Attorney, Agent, or Firm*—Oliff & Berridge, PLC

(57) ABSTRACT

A technique for reducing surface soiling of optical components used in projectors and other devices is provided. An optical component 310G comprises: a light transmissive member 301; and a light transmissive film TF formed on the light transmissive member. The light transmissive film comprises: a semiconductor photocatalyst film PCF constituting the outside surface of the optical component; and an antistatic film ASF formed between the semiconductor photocatalyst film PCF and the light transmissive member 301.

27 Claims, 13 Drawing Sheets

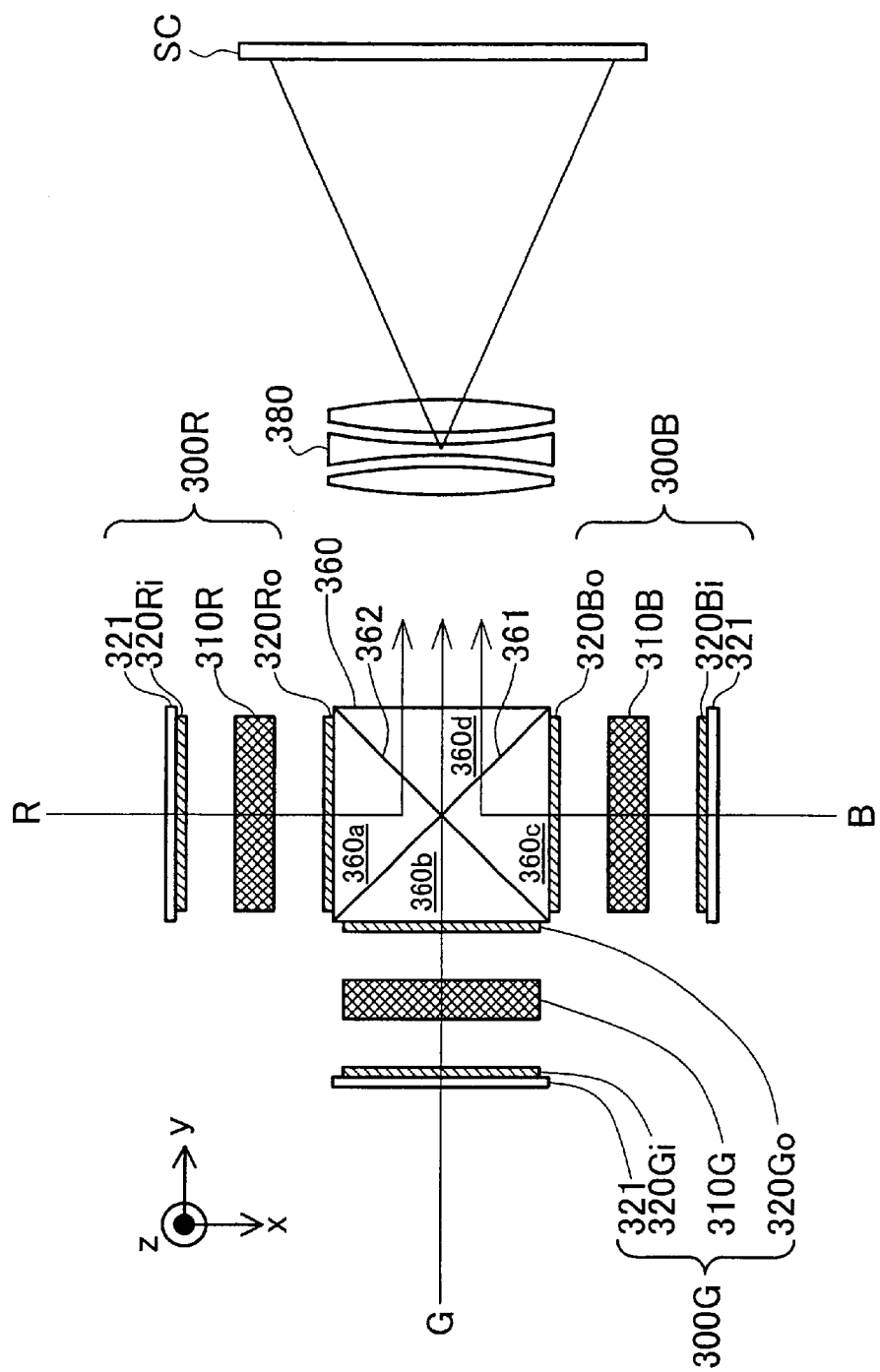

OPTICAL COMPONENT AND PROJECTOR USING THE SAME

BACKGROUND OF THE INVENTION

1. Field of the Invention

The present invention relates to a projector for projecting and displaying of an image, and in particular to an optical component used in a projector.

2. Description of the Related Art

Projectors display images by modulating light from an illumination optical system in response to image information (image signal) by means of a liquid crystal panel, and projecting the modulated light onto a screen.

Optical components in projectors typically have surfaces formed of glass, and thus have the drawback of being susceptible to soiling. This is because the surface of an insulator such as glass is susceptible to becoming statically charged. The charged surface of an insulator attracts dust by static electricity. Dust adhering to the surface of an optical component soils the surface of the optical component. Electrically driven optical components such as liquid crystal panels are especially susceptible to buildup of static charge on the surface, so the above problem is particularly severe in liquid crystal panels.

SUMMARY OF THE INVENTION

An object of the present invention is to provide a technique for reducing surface soiling of optical components used in projectors and other devices.

At least part of the above and the other related objects is attained by an optical component as a first device of the present invention. The optical component comprises: a light transmissive member; and a light transmissive film formed on the light transmissive member. The light transmissive film includes: a semiconductor photocatalyst film constituting the outside surface of the optical component; and an antistatic film formed between the semiconductor photocatalyst film and the light transmissive member.

Herein, the term "antistatic film" includes not only films that prevent buildup of static charge, but also films that reduce static charge.

This optical component is provided with a light transmissive film including an antistatic film and a semiconductor photocatalyst film. It is accordingly possible to reduce static charge on the surface of the optical component, so as to reduce adhesion of dust to the surface of the optical component. When the optical component is illuminated with a light component capable of activating the semiconductor photocatalyst film, organic matter (dust) adhering to the surface of the optical component is decomposed, allowing organic matter (dust) adhering to the surface of the optical component to be cleared. As a result, it is possible to reduce soiling of the surface of the optical component.

In the above device, it is preferable that the semiconductor photocatalyst film contains $TiO_2$.

By so doing, soiling of the optical component surface can be reduced more efficiently than is possible with semiconductor photocatalyst films containing other materials.

It is preferable that the $TiO_2$ is of anatase crystalline form.

In this case, soiling of the optical component surface can be reduced more efficiently than is possible with $TiO_2$ of rutile crystalline form.

In the above device, it is preferable that the antistatic film has surface resistivity of less than about $1.0 \times 10^{10}$ Ω.

This arrangement affords effective functioning as an antistatic film.

In the above device, it is preferable that the semiconductor photocatalyst film is formed on the antistatic film, and the antistatic film includes an $SiO_2$ layer situated at the interface thereof with the semiconductor photocatalyst film.

$SiO_2$ is typically highly hydrophilic. Accordingly, with the above arrangement the $SiO_2$ layer can improve the hydrophilic function of the semiconductor photocatalyst film. Further, where the antistatic film contains organic matter, the $SiO_2$ layer can reduce deterioration of the antistatic film by activation of the semiconductor photocatalyst.

It is preferable that the antistatic film includes a transparent conductive layer.

In this case, the surface resistivity of the antistatic film can be brought to a relatively low level, and the transparency of the antistatic film is readily assured.

In the above device, it is preferable that the light transmissive film is formed at least in a specific region on which particular light designed to enter the optical component is to be incident.

By so doing, the light transmissive film can be formed over a relatively small area, thereby making fabrication of the optical component relatively easy.

The present invention is also directed to a second device that is a projector for projecting and displaying of an image. The projector comprises: an illumination optical system; an electro-optical device for modulating light from the illuminating optical system in response to image information; and a projection optical system for projecting the modulated light from the electro-optical device. At least one of a plurality of optical components arranged on the optical path from the illumination optical system to the projection optical system comprises: a light transmissive member; and a light transmissive film formed on the light transmissive member. The light transmissive film includes: a semiconductor photocatalyst film constituting the outside surface of the optical component; and an antistatic film formed between the semiconductor photocatalyst film and the light transmissive member.

This projector employs the first device of the present invention. It is accordingly possible to achieve functions and advantages similar to those obtained using the first device, and to reduce soiling of optical component surfaces. By incorporating the optical component herein into the projector, the efficiency of utilization of light in the projector can be improved.

In the above device, it is preferable that the illumination optical system includes a light source device for emitting light that includes a light component having a predetermined wavelength capable of activating the semiconductor photocatalyst film.

By so doing, light emitted from the light source device can be used to activate the semiconductor photocatalyst film formed on the surface of the optical component, obviating the need for a special light source device for this purpose.

In the above device, it is preferable that the electro-optical device is said optical component.

In this case, surface soiling of the electro-optical device, which is relatively more susceptible to becoming statically charged, can be reduced.

The above device may further comprises: an chassis for accommodating the plurality of optical components arranged on the optical path from the illumination optical system to the projection optical system; and at least one cooling fan for cooling interior of the chassis.

Where a cooling fan is provided, the optical component surface becomes more susceptible to static charge buildup due to the air flowing in proximity to the optical component surface. Accordingly, the advantages of the invention are particularly notable where a cooling fan is provided.

The above device may further comprises: a filter having a semiconductor photocatalyst affixed thereto, arranged at ventilation passage of the cooling fan.

By using a filter in this way, penetration of dust into the interior of the chassis can be reduced, thereby reducing soiling of optical component surfaces. Since the semiconductor photocatalyst affixed to the filter decomposes dust adhering to the filter, dust adhering to the filter can be cleared. As a result, clogging of the filter can be reduced, allowing the cooling fan to efficiently cool the interior of the chassis.

The present invention is also directed to a third device that is a projector for projecting and displaying of a color image. The projector comprises: an illumination optical system; a color separation optical system for separating light emitted from the illumination optical system into first through third colored lights; first through third electro-optical devices for modulating the first through third colored lights in response to image information to generate first through third modulated lights; a color combination optical system for combining the first through third modulated lights; and a projection optical system for projecting the composite light from the color combination optical system. At least one of a plurality of optical components arranged on the optical path from the illumination optical system to the projection optical system comprises: a light transmissive member; and a light transmissive film formed on the light transmissive member. The light transmissive film includes: a semiconductor photocatalyst film constituting the outside surface of the optical component; and an antistatic film formed between the semiconductor photocatalyst film and the light transmissive member.

This projector also employs the first device of the present invention. It is accordingly possible to achieve functions and advantages similar to those obtained using the first device, and to reduce soiling of optical component surfaces. By incorporating the optical component herein into the projector, the efficiency of utilization of light in the projector can be improved.

In the above device, it is preferable that the illumination optical system includes a light source device for emitting light that includes a light component having a predetermined wavelength capable of activating the semiconductor photocatalyst film.

It is also preferable that the first through third electro-optical devices are said optical components, and the color separation optical system emits the first through third colored lights that include a light component having a predetermined wavelength emitted from the light source device.

In this case, light emitted from the light source device can be used to activate the semiconductor photocatalyst film formed on the surface of the electro-optical device, obviating the need for a special light source device for this purpose.

These and other objects, features, aspects, and advantages of the present invention will become more apparent from the following detailed description of the preferred embodiments with the accompanying drawings.

BRIEF DESCRIPTION OF THE DRAWINGS

FIG. 4 is an illustrative diagram showing an enlarged view of the liquid crystal light valves 300R, 300G, 300B and cross dichroic prism 360 of FIG. 1;

DESCRIPTION OF THE PREFERRED EMBODIMENT

Figure 1:
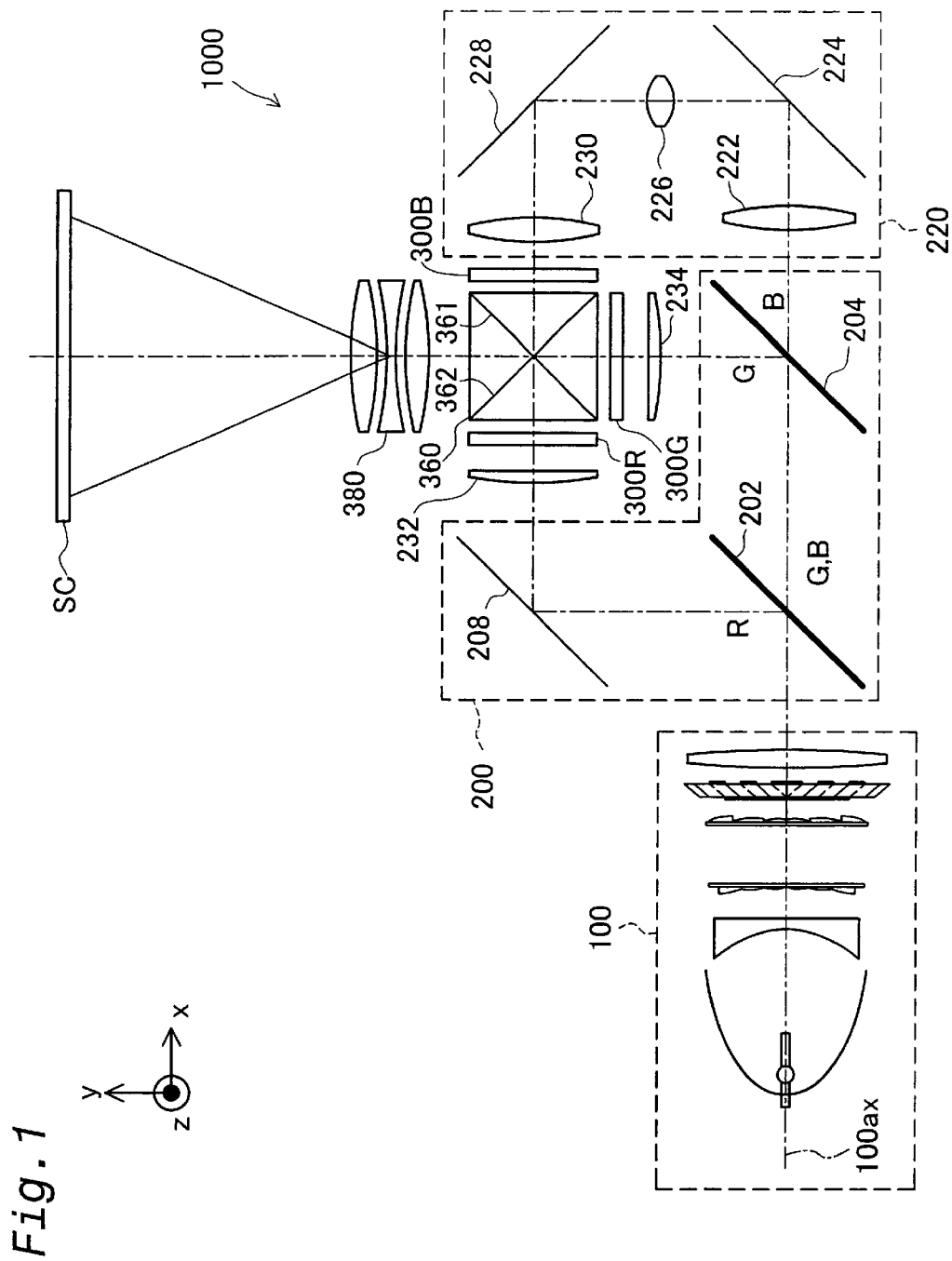
FIG. 1 is a simplified schematic diagram showing an exemplary projector embodying the present invention.

A. First Embodiment:

A-1. Optical Structure of Projector:

One mode of carrying out the present invention is discussed below according to an embodiment. FIG. 1 is a simplified schematic diagram showing an exemplary projector embodying the present invention. The projector 1000 comprises: an illumination optical system 100; a color separation optical system 200; a relay optical system 220; three liquid crystal light valves 300R, 300G, 300B; a cross dichroic prism 360; and a projection optical system 380.

Light emitted by the illumination optical system 100 is separated by the color separation optical system 200 into three colored lights of red (R), green (G), and blue (B). The separated colored lights are modulated by liquid crystal light valves 300R, 300G, 300B, respectively, in response to image information. Modulated lights modulated by the liquid crystal light valves in response to image information are combined by the cross dichroic prism 360 and projected onto a screen SC by the projection optical system 380. This arrangement enables an image to be displayed on the screen SC.

Figure 2:
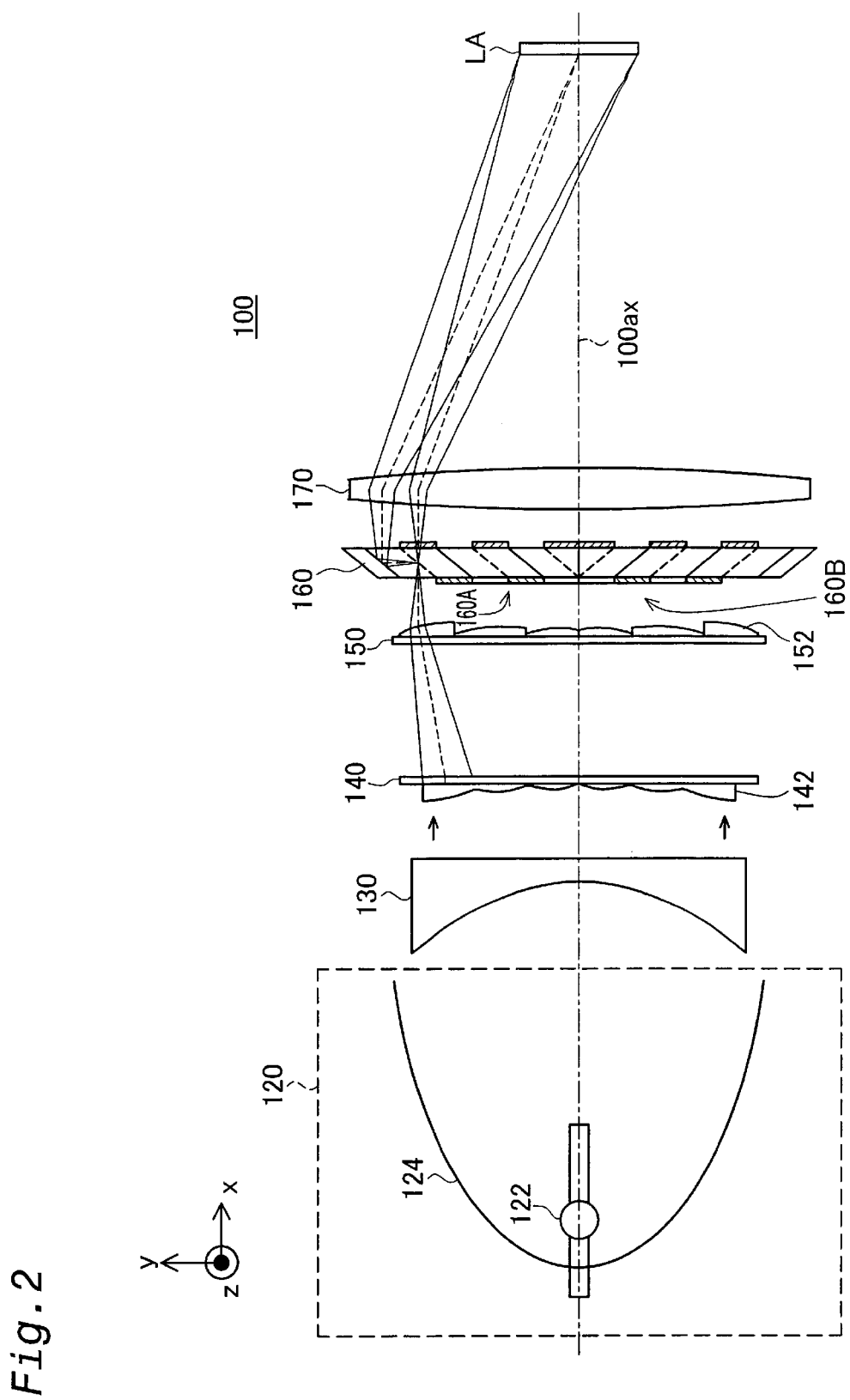
FIG. 2 is an illustrative diagram showing an enlarged view of the illumination optical system 100 of FIG. 1.

FIG. 2 is an illustrative diagram showing an enlarged view of the illumination optical system 100 of FIG. 1. The illumination optical system 100 comprises: a light source device 120; a collimating lens 130; first and second lens arrays 140, 150; a polarization optical system 160; and a superimposing lens 170. The optical components are aligned along to the optical axis 100ax of the system. The system optical axis 100ax is the center axis of the light bundle emitted by light source device 120. In FIG. 2, lighted area LA lit by illumination optical system 100 corresponds to the liquid crystal light valves 300R, 300G, 300B of FIG. 1.

The light source device 120 comprises a lamp 122 and a reflector 124 having a concave face of ellipsoid of revolution. Lamp 122 is arranged in proximity to a first focal point of the ellipsoidal face of reflector 124. Light emitted by lamp 122 is reflected by reflector 124, and the reflected light is condensed and directed towards a second focal point of reflector 124. The collimating lens 130 is a plano-concave lens that converts condensed light from the light source device 120 into a light substantially parallel to the system optical axis 100ax.

The first and second lens arrays 140, 150 have a plurality of small lenses 142, 152 arrayed in matrices. The first lens array 140 has the function of dividing the substantially parallel light bundle emitted by the collimating lens 130 into a plurality of partial light bundles for output. The second lens array 150 has the function of aligning the partial light bundles output by the first lens array 140 so that their center axes are substantially parallel to the system optical axis 100ax. The second lens array 150, together with the superimposing lens 170, has the function of forming the images of the small lenses 142 of the first lens array 140 on the lighted area LA.

The small lenses 142, 152 are plano-convex decentered lenses whose external shape, viewed from the x direction, is approximately similar to that of the lighted area LA (liquid crystal light valves). As shown in FIG. 2, decentered lenses having different eccentricities are used as the first small lens 142 and second small lens 152. For example, the outermost peripheral small lens 142 of the first lens array 140 is decentered such that the principal ray of a divided partial light bundle proceeds on the diagonal with respect to the system optical axis 100ax. The outermost peripheral small lens 152 of the second lens array 150 is decenterd such that the principal ray of a partial light bundle which enters there on the diagonal with respect to the system optical axis 100ax is made substantially parallel to the system optical axis 100ax.

Partial light bundles emitted by the small lenses 142 of the first lens array 140 are condensed via the small lenses 152 of the second lens array 150 at a location in proximity thereto, namely, within the polarization optical system 160, as shown in FIG. 2.

The polarization optical system 160 comprises two polarizing element arrays 160A, 160B, that are integrated. The first and second polarizing element arrays 160A, 160B are arranged symmetrically with respect to the system optical axis 100ax.

Figure 3A:
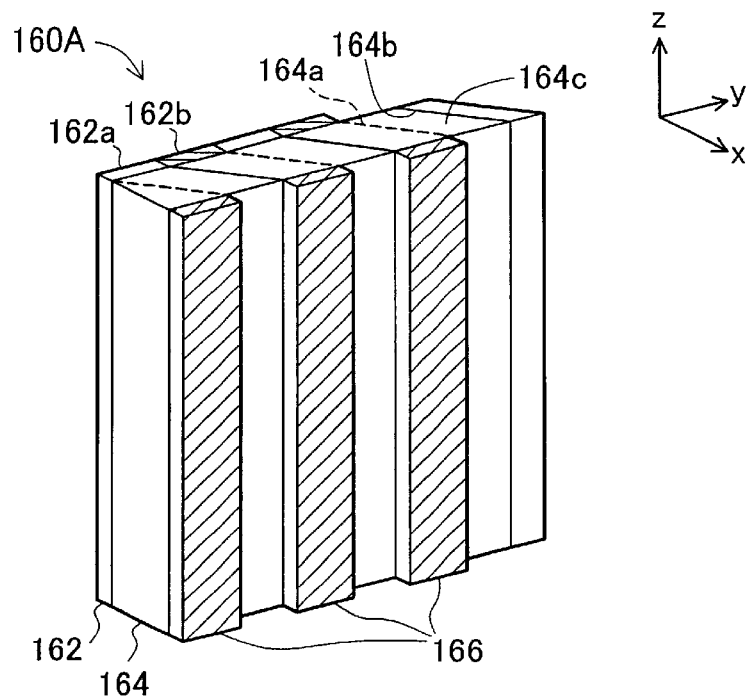
FIGS. 3(A) and 3(B) are illustrative diagrams showing an enlarged view of the first polarizing element array 160A of FIG. 2.
Figure 3B:
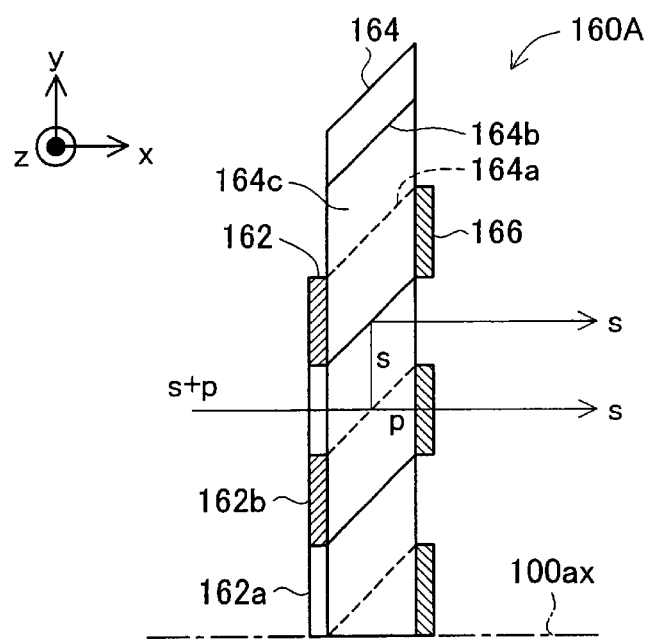

FIGS. 3(A) and 3(B) are illustrative diagrams showing an enlarged view of the first polarizing element array 160A of FIG. 2. FIG. 3(A) is a perspective view of the first polarizing element array 160A, and FIG. 3(B) is a plane view thereof viewed from the +z direction. First polarizing element array 160A comprises a shading plate 162, a polarized beam splitter array 164, and a plurality of λ/2 retardation plates 166 selectively arranged at the exiting light face of the polarized beam splitter array 164. The second polarizing element array 160B has similar structure.

As shown in FIGS. 3(A) and (B), polarized beam splitter array 164 is composed of a plurality of columnar light transmissive members 164c of substantially parallel-quadrangular cross section, bonded each other. Polarized light separating films 164a and reflective films 164b are alternatively formed at the interfaces of the individual light transmissive members 164c.

Shading plate 162 is composed of open faces 162a and shading faces 162b arranged in stripe configuration. Open faces 162a and shading faces 162b are provided in association with the polarized light separating films 164a and reflective films 164b, respectively. In this way, partial light bundles exiting the first lens array 140 (FIG. 2) enter only the polarized light separating films 164a of the polarized beam splitter array 164 via the open faces 162a, and do not enter the reflective films 164b.

As shown by the solid line in FIG. 3(B), the principal ray (center axis) of a partial light bundle exiting the first lens array 140 (FIG. 2) enters the open face 162a of shading plate 162 in a direction substantially parallel to the system optical axis 100ax. The partial light bundle passing through the open face 162a is separated into an s-polarized light bundle and a p-polarized light bundle by the polarized light separating film 164a. The p-polarized light bundle passes through the polarized light separating film 164a and exits the polarized beam splitter array 164. The s-polarized light bundle, on the other hand, is reflected by the polarized light separating film 164a, again reflected by the reflecting film 164b, and then exits the polarized beam splitter array 164.

The λ/2 retardation plates 166 are formed on the exiting light face of the polarized beam splitter array 164, exclusively in those portions thereof from which p-polarized light bundles passing through polarized light separating films 164a exit. λ/2 retardation plates 166 have the function of converting linearly polarized incident light into linearly polarized light that has orthogonal polarization direction. That is, a p-polarized light bundle exits after being converted into an s-polarized light bundle by the λ/2 retardation plates 166. Thus, non-polarized partial lights (s+p) entering polarizing element array 160A exits after being converted to s-polarized light bundles.

As noted, each one of the plurality of partial light bundles exiting the first lens array 140 is separated by the polarization optical system 160 into two partial light bundles which are converted into substantially a single kind of linearly polarized light having the same polarization direction. The plurality of partial light bundles having the same polarization direction are superimposed on lighted area LA by the superimposing lens 170 of FIG. 2. The light illuminating the lighted area LA has a substantially uniform intensity distribution.

Color separation optical system 200 (FIG. 1) comprises two dichroic mirrors 202, 204; and a reflecting mirror 208. This optical system has the function of separating light exiting the illumination optical system 100 into three colored lights of red (R), green (G), and blue (B). The first dichroic mirror 202 reflects red light R in the light exiting the illumination optical system 100, while passing blue light B and green light G. The red light R reflected by the first dichroic mirror 202 is reflected by the reflecting mirror 208 and then passes through a field lens 232 to enter the liquid crystal light valve 300R for red light. Field lens 232 has the function of converting partial light bundles exiting the illumination optical system 100 into light bundles substantially parallel to the system optical axis 100ax. The field lenses 234, 230 provided to the other liquid crystal light valves 300G, 300B have similar function.

Blue light B and green light G passing through the first dichroic mirror 202 is separated by the second dichroic mirror 204. Green light G is reflected by the second dichroic mirror 204 and then passes through field lens 234 to enter the liquid crystal light valve 300G for green light. Blue light B, on the other hand, passes through the second dichroic mirror 204 and then enters relay optical system 220.

Blue light B entering the relay optical system 220 passes through the elements of relay optical system 220, i.e., an incident side lens 222, a first reflecting mirror 224, a relay lens 226, a second reflecting mirror 228, and an exiting side lens (field lens) 230, and enters the liquid crystal light valve 300B for blue light. The reason for employing a relay optical system 220 on the optical path for blue light B is that the optical path length for blue light B is longer than the optical path lengths for the other colored lights R and G. The use of a relay optical system 220 allows blue light B incident on the incident side lens 222 to be transmitted as-is to the exiting side lens 230.

The three liquid crystal light valves 300R, 300G, 300B modulate the three colored incident lights in response to image information (image signal) given thereto, to produce modulated lights. Cross dichroic prism 360 combines the modulated lights exiting the liquid crystal light valves.

FIG. 4 is an illustrative diagram showing an enlarged view of the liquid crystal light valves 300R, 300G, 300B and cross dichroic prism 360 of FIG. 1. While the following description focuses upon the second liquid crystal light valve 300G, the other liquid crystal light valves 300R, 300G are analogous.

The second liquid crystal light valve 300G comprises a liquid crystal panel 310G, and two polarizing plates 320Gi, 320Go provided at the incident light side and exiting light side thereof. The first polarizing plate 320Gi arranged at the incident light side is bonded to a light transmissive substrate 321. The second polarizing plate 320Go arranged at the exiting light side is bonded to the cross dichroic prism 360.

Colored light G entering the second liquid crystal light valve 300G of FIG. 4 is emitted from the illumination optical system 100 (FIG. 1) comprising the polarization optical system 160, and therefore consists of substantially one kind of linearly polarized light. The first polarizing plate 320Gi arranged at the incident light side of the second liquid crystal light valve 300G is set such that the polarization axis thereof is the same as the polarization direction of linearly polarized light incident thereon. Accordingly, substantially all of the colored light G entering the first polarizing plate 320Gi passes as-is through the first polarizing plate 320Gi. Polarized light exiting the first polarizing plate 320Gi is modulated by the liquid crystal panel 310G. Of the light modulated by the liquid crystal panel 310G, the second polarizing plate 320Go only outputs that component whose polarization direction is the same as its own polarization axis. Modulated light (linearly polarized light) exiting the second polarizing plate 320Go enters the cross dichroic prism 360.

It should be noted that the liquid crystal panels 310R, 310G, 310B included in the liquid crystal light valves 300R, 300G, 300B correspond to the electro-optical devices of the present invention.

The cross dichroic prism 360 (FIG. 4) combines the three colored light (modulated light) modulated by liquid crystal light valves 300R, 300G, 300B, to produce composite light representing a color image. The cross dichroic prism 360 is divided by interfaces of roughly "X" configuration into four rectangular prisms 360a–360d composed of light transmissive members. A red light-reflective film 361 and a blue light-reflective film 362 are formed at the "X" interfaces.

Modulated colored light R (linearly polarized light) exiting the first liquid crystal light valve 300R is reflected by the red light-reflective film 361 of the cross dichroic prism 360, while modulated colored light B (linearly polarized light) exiting the third liquid crystal light valve 300B is reflected by the blue light-reflective film 362. Modulated colored light G (linearly polarized light) exiting the second liquid crystal light valve 300G, on the other hand, passes through the two reflective films 361, 362 of the cross dichroic prism 360. By means of the red light-reflective film 361 and blue light-reflective film 362 the three colored lights are combined to produce composite light representing a color image. For convenience, in FIG. 4, the locations at which red light R and blue light B are reflected are shown some distance away from the two reflective films 361, 362.

The projection optical system 380 projects the composite light exiting the cross dichroic prism 360 onto a screen SC, whereby a color image is displayed on the screen SC.

Figure 5:
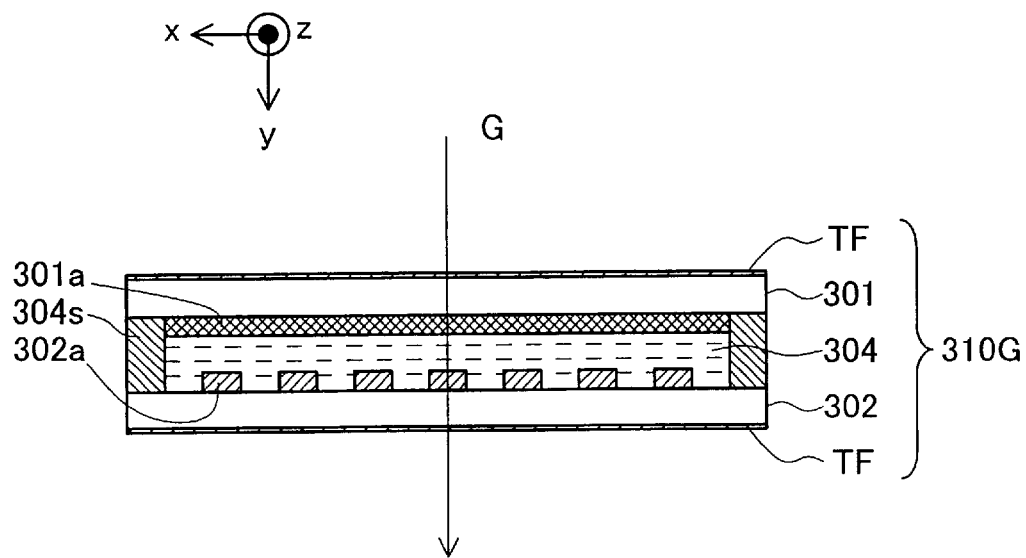
FIG. 5 is a simplified sectional view of the second liquid crystal panel 310G of FIG. 4.

A-2. Structure of Liquid Crystal Panels:

FIG. 5 is a simplified sectional view of the second liquid crystal panel 310G of FIG. 4. As shown, the second liquid crystal panel 310G comprises: a pair of glass substrates 301, 302; a liquid crystal layer 304 sandwiched between the pair of glass substrates 301, 302; and seal members 304s for preventing the liquid crystal from leaking out. The first glass substrate 301 is provided with a transparent common electrode 301a at a boundary with the liquid crystal layer 304. The second glass substrate 302 is provided with thin film transistors (not shown) and transparent pixel electrodes 302a arranged in a matrix for each pixel at a boundary with the liquid crystal layer 304. The other liquid crystal panels 310R, 310B have similar structure.

As noted, liquid crystal panels 310R, 310G, 310B are optical components that are electrically driven in response to image information (image signal), and accordingly the pair of glass substrates 301, 302 that form the surfaces of each liquid crystal panel are more susceptible than other optical components to becoming statically charged. When the surfaces of a liquid crystal panel become statically charged, dust is attracted by static electricity, resulting in the problem of soiling of the surfaces of the liquid crystal panel. When an image from a liquid crystal panel with a soiled surface is projected onto a screen, the brightness of the image may be reduced, or dust shadows may appear in the image. Accordingly, in this embodiment, light transmissive films TF are formed on the incident light face and exiting light face—in other words, on the surfaces of the pair of glass substrates 301, 302—of liquid crystal panels 310R, 301G, 301B, in order to reduce soiling of liquid crystal panel surfaces.

Figure 6:
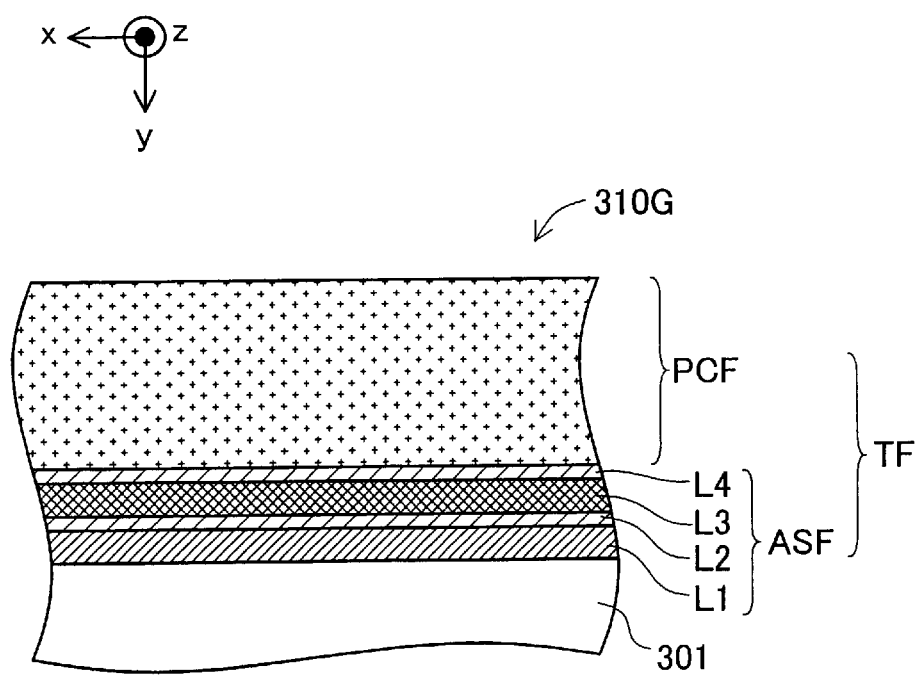
FIG. 6 is an illustrative diagram showing an enlarged view of the surface of the first glass substrate 301 depicted in FIG. 5.

FIG. 6 is an illustrative diagram showing an enlarged view of the surface of the first glass substrate 301 depicted in FIG. 5. As shown, the surface of the first glass substrate 301 is provided with a light transmissive film TF including an antistatic film ASF and a photocatalyst film PCF.

Antistatic film ASF has the function of preventing dust from adhering to the surface of liquid crystal panel 310G (FIG. 5). The antistatic film ASF of this embodiment is composed of four layers L1–L4. Specifically, the first layer L1 on glass substrate 301 is a layer of $ZrO_2$ having a refractive index of about 2.0 and thickness of about 70 nm. The second layer L2 is a layer of $SiO_2$ having a refractive index of about 1.46 and thickness of about 30 nm. The third layer L3 is a layer of ITO (indium tin oxide: $In_2O_3+SnO_2$) having a refractive index of about 1.9 and thickness of about 70 nm. The fourth layer L4 is a layer of $SiO_2$ having a refractive index of about 1.46 and thickness of about 40 nm. The glass substrate 301 itself is a light transmissive member having a refractive index of about 1.52. By adopting this layered structure, light incident on the antistatic film ASF can efficiently enter the glass substrate 301. It should be noted that Layers L1–L4 may be formed by means of well-known physical vapor deposition (PVD) techniques, for example.

The ITO layer constituting the third layer L3 is a transparent conductive layer. This allows the surface resistivity of the antistatic film ASF to be held to a relatively low level, and facilitates ensuring the translucency of the antistatic film ASF. In this embodiment the antistatic film ASF exhibits surface resistivity of about $3.7 \times 10^9$ Ω at a temperature of about 25° C. and relative humidity of about 50%. In general, static electricity tends to build up where surface resistivity is about $1.0 \times 10^{10}$ Ω or above. Accordingly, the surface resistivity of the transparent conductive layer is preferably below about $1.0 \times 10^{10}$ Ω. This enables effective functioning as an antistatic film.

The photocatalyst film PCF has the function of clearing organic matter adhering to the surface of liquid crystal panel 310G. The photocatalyst film PCF contains a semiconductor photocatalyst. When this semiconductor photocatalyst is illuminated with light of a particular wavelength (typically ultraviolet) a photocatalytic reaction is induced. Through this photocatalytic reaction the semiconductor photocatalyst exhibits a decomposing function and a hydrophilic function.

Figure 7:
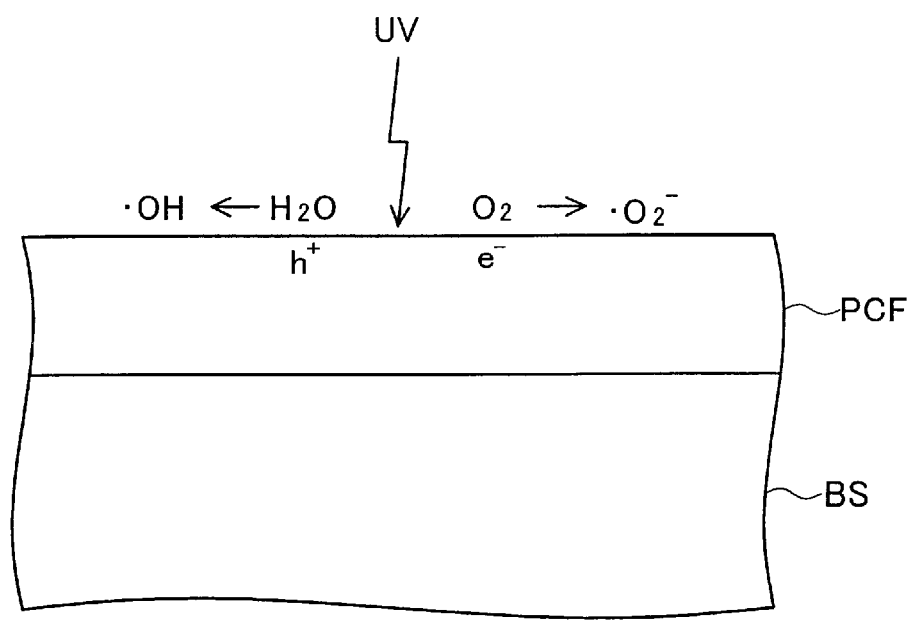
FIG. 7 is an illustrative diagram showing a simple representation of the principle of the photocatalytic reaction of the semiconductor photocatalyst.

FIG. 7 is an illustrative diagram showing a simple representation of the principle of the photocatalytic reaction of the semiconductor photocatalyst. In FIG. 7 the semiconductor photocatalyst film PCF is formed on a substrate BS. Substrate BS corresponds to the glass substrate 301 (FIG. 6) with the antistatic film ASF. When the photocatalyst film PCF is irradiated with light having energy that exceeds the bandgap of the semiconductor (typically ultraviolet UV), the semiconductor is activated, and electrons ($e^-$) and holes ($h^+$) are generated. These electrons and holes diffuse through the surface of the photocatalyst film PCF and induce a photocatalytic reaction. Specifically, holes oxidize adsorbed water present on the photocatalyst film surface and water vapor ($H_2O$) present in the air. During this process hydroxy radicals ($\cdot OH$), which have high oxidative decomposing ability, are generated. Hydroxy radicals decompose organic matter adhering to the photocatalyst film into carbon dioxide and water, so that a decomposing function is exhibited. Electrons, on the other hand, reduce adsorbed oxygen present on the photocatalyst film surface and oxygen ($O_2$) present in the air. This process generates superoxide anions ($\cdot O_2^-$). Superoxide anions form peroxides or are converted to water via hydrogen peroxide, so that a hydrophilic function is exhibited.

In this embodiment, the semiconductor photocatalyst included in the photocatalyst film PCF is titanium oxide ($TiO_2$), an n-type semiconductor. Titanium dioxide may take one of three crystalline forms: rutile, anatase and brookite. The rutile and anatase type titanium dioxide are typically used in industrial applications. Rutile type titanium oxide has a bandgap of about 3.0 eV and is activated by light of wavelengths of about 413 nm and below. Anatase type titanium dioxide, on the other hand, has a bandgap of about 3.2 eV and is activated by light of wavelengths of about 388 nm and below. It is known that anatase type titanium dioxide exhibits higher photocatalytic function than does rutile type titanium oxide.

In this embodiment, the photocatalyst film PCF is produced with a solution prepared from a solution (sol) containing particles of anatase type titanium dioxide, by adding a binder that hardens at relatively low temperature (for example, from room temperature to 120° C.). In preferred embodiment, the binder is an inorganic binder composed of inorganic material that resists deterioration by the decomposing function of the photocatalyst; preferred materials include siloxane binders such as silica. The solution containing the added binder is coated onto the substrate BS using a spray, spinner, or dipping process, etc. With subsequent drying at relatively low temperature (for example, from room temperature to 120° C.), the photocatalyst film PCF becomes affixed to the substrate BS. In this embodiment photocatalyst film PCF thickness is set to about 500–1000 nm, but could be made thinner. By adding suitable amounts of Pt (platinum) or Pd (palladium) to the photocatalyst film PCF, the efficiency of the photocatalytic reaction may possibly be improved.

Alternatively the photocatalyst film PCF may be produced by other processes, such as well known physical vapor deposition (PVD) and chemical vapor deposition (CVD) techniques. The photocatalyst film PCF may also be produced using a solution (sol) containing particles of an oxide precursor, derived by hydrolysis of titanium alkoxide (a titanium organic compound). This solution is coated onto the substrate BS and then baked on at relatively high temperature (for example, about 500° C.–800° C.) to affix the photocatalyst film onto the substrate. Conducting the baking process at relatively high temperature gives a film that is relatively hard and dense, but at least some of the titanium oxide within the film takes on the rutile type crystalline form, which has relatively low photocatalytic function. Accordingly, by preparing the photocatalyst film PCF in such a way that anatase type titanium oxide is the principal component, as in the present embodiment, it is possible to ensure that the photocatalyst film PCF will exhibit high photocatalytic function, and that as a result soil present on the surface of the liquid crystal panel 310G will be efficiently reduced.

In preferred embodiment, the photocatalyst film PCF formed on the substrate BS will have a water droplet contact angle of about 5° or less when water is dripped thereon under conditions of adequate illumination with light. In this embodiment, the photocatalyst film exhibits a high level of hydrophilicity (termed super-hydrophilicity).

By providing the glass substrate 301 with a light transmissive film TF that includes an antistatic film ASF and a photocatalyst film PCF in the above manner, soiling of the surface of the liquid crystal panel 310G can be reduced. That is, static charge on the surface of the liquid crystal panel is reduced by the antistatic film ASF so that adhesion of dust to the liquid crystal panel surface is reduced. If organic matter should happen to adhere to the liquid crystal panel surface, the organic matter is decomposed and cleared by the photocatalyst film PCF.

The hydrophilic function of the photocatalyst film PCF has the advantage of reducing condensation on the surfaces of the liquid crystal panels 310R, 310G, 310B.

In this embodiment, the photocatalyst film PCF is formed over the antistatic film ASF. And the antistatic film ASF contains an $SiO_2$ layer L4 situated at the interface thereof with the photocatalyst film PCF. $SiO_2$ layer has relatively high hydrophilicity. Accordingly, the hydrophilic function of the photocatalyst film PCF is enhanced by the $SiO_2$ layer L4. Further, while the antistatic film ASF in this embodiment is composed of inorganic matter, even if the antistatic film includes organic matter, the $SiO_2$ layer—which is a layer of inorganic material—will prevent organic matter present in the antistatic film from being decomposed through activation of the photocatalyst, thus reducing deterioration of the antistatic film.

By the way, the liquid crystal panels 310R, 310G, 310B must be illuminated with light of a particular wavelength (typically ultraviolet) in order to activate the photocatalyst film PCF. The lamp 122 provided to the light source device 120 (FIG. 2) in this embodiment is a high-pressure mercury lamp, and therefore emits light including ultraviolet. In this embodiment the color separation optical system 200 (FIG. 1) is designed to emit three colored lights R, G, B including the ultraviolet emitted by the light source device 120. Specifically, the first dichroic mirror 202 is designed to reflect red light R and a portion of the ultraviolet, and to pass green light G, blue light B and a portion of the ultraviolet. The second dichroic mirror 204 is designed to reflect green light G and a portion of the ultraviolet, and to pass blue light B and a portion of the ultraviolet. In this way ultraviolet may be supplied to the liquid crystal panels 310R, 310G, 310B.

It should be noted that where the amount of ultraviolet supplied to the liquid crystal panels 310R, 310G, 310B is relatively low, the photocatalyst film PCF will not be able to exhibit adequate photocatalytic function. In such cases, it is desirable to provide another special light source device for emitting ultraviolet. However, activating the semiconductor photocatalyst film on the surface of the optical component using the light emitted by the single light source device 120 has the advantage of obviating the need for such a special light source device.

As described hereinabove, the projector 1000 of the present embodiment comprises: an illumination optical system 100; a color separation optical system 200 for separating light emitted by the illumination optical system 100 into first through third colored lights; first through third liquid crystal light valves 300R, 300G, 300B for modulating the first through third colored lights in response to image information to produce first through third modulated lights; a cross dichroic prism 360 for combining the first through third modulated lights; and a projection optical system 380 for projecting the composite light emitted by the cross dichroic prism 360. Each of the liquid crystal panels 310R, 310G, 310B comprises glass substrates 301, 302, and a light transmissive film TF formed on the glass substrates 301, 302. The light transmissive film TF comprises a semiconductor photocatalyst film PCF constituting the outer surface of the liquid crystal panel, and an antistatic film ASF formed between the semiconductor photocatalyst film PCF and the glass substrates 301, 302. By employing such liquid crystal panels 310R, 310G, 310B, soiling of liquid crystal panel surfaces can be reduced. By incorporating these liquid crystal panels in a projector, it is possible to reduce loss of brightness in images displayed on a screen, and to reduce dust shadows appearing in the images, thereby improving the utilization efficiency of light in the projector.

B. Second Embodiment:

In actual practice, the projector 1000 of first embodiment (FIG. 1) comprises an chassis, and the optical components are housed within the chassis. Specifically, the optical components are mounted on a supporting frame which is then housed in the chassis.

Figure 8:
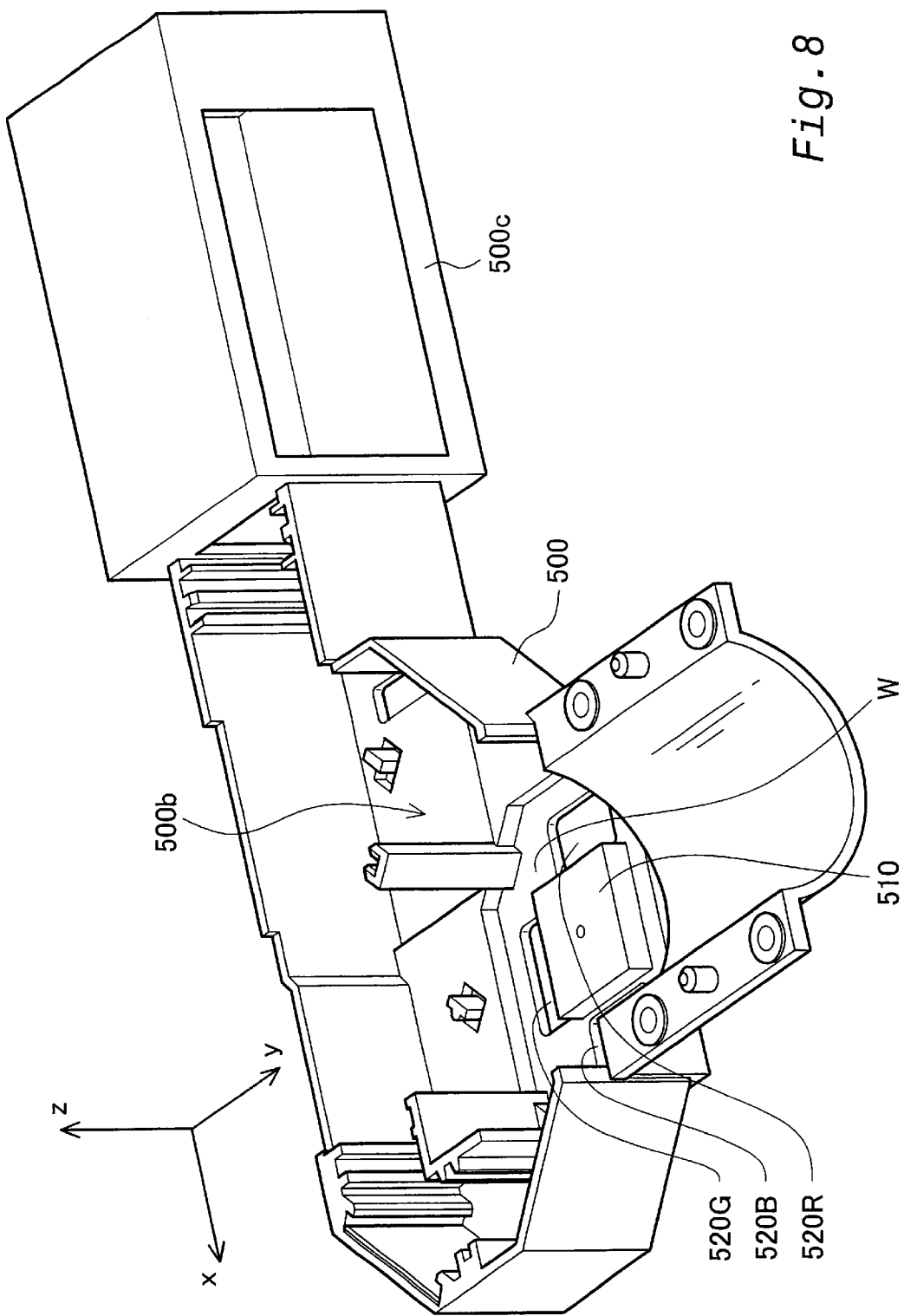
FIG. 8 is a perspective view of a supporting frame 500 for mounting the optical components of the projector.

FIG. 8 is a perspective view of a supporting frame 500 for mounting the optical components of the projector. As shown in the drawing, the inside side wall of supporting frame 500 has convex portions for mounting optical components. The floor 500b of the supporting frame 500 has ridged column members having convex or concave portions for mounting optical components. A mounting stage 510 for mounting the cross dichroic prism 360 is provided on the floor 500b of the supporting frame 500. Around the mounting stage 510 is relatively low area W, this area W containing three relatively large openings 520R, 530G, 520B.

Figure 9:
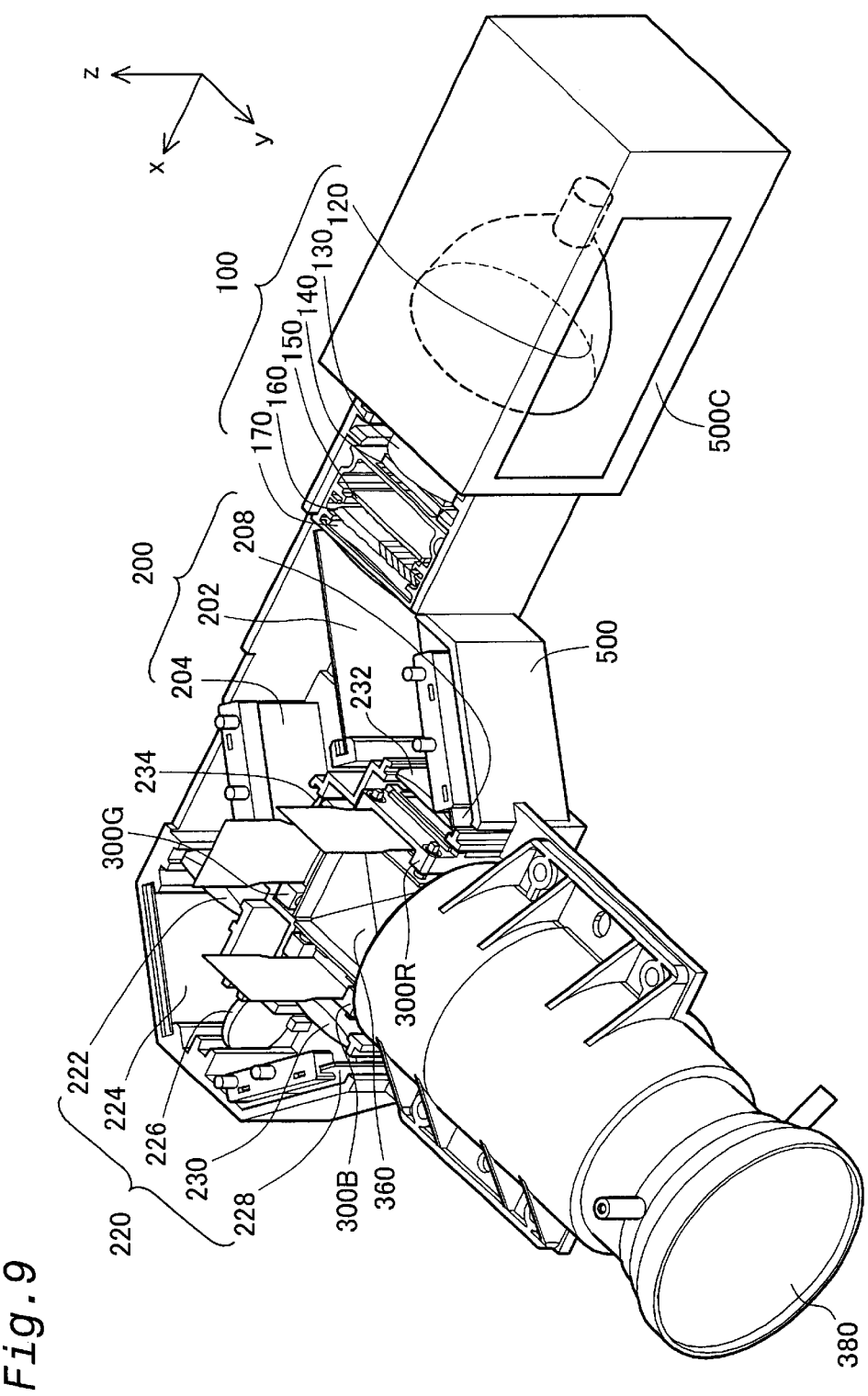
FIG. 9 is a perspective view showing the projector optical components mounted on the supporting frame 500.

FIG. 9 is a perspective view showing the projector optical components mounted on the supporting frame 500. As shown in the drawing, the various optical components that constitute the illumination optical system 100, color separation optical system 200, relay optical system 220, liquid crystal light valves 300R, 300G, 300B, cross dichroic prism 360, projection optical system 380 etc. are mounted on the supporting frame 500. The light source device of the illumination optical system 100 is installed within a case 500C provided at one end of the supporting frame 500.

Figure 10:
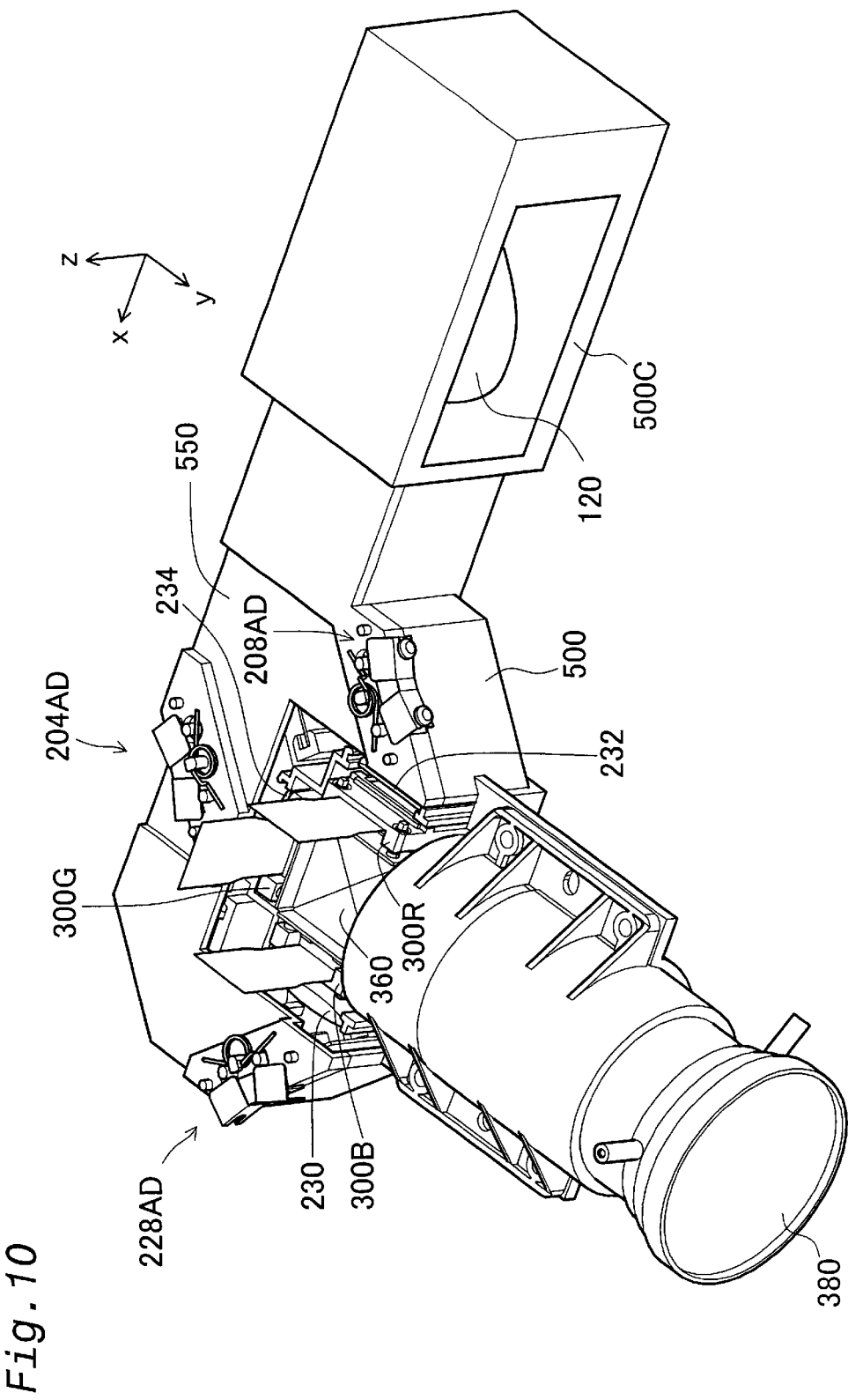
FIG. 10 is a perspective view showing the supporting frame 500 of FIG. 9 with a supporting frame cover 550 attached thereto.

FIG. 10 is a perspective view showing the supporting frame 500 of FIG. 9 with a supporting frame cover 550 attached thereto. As shown in the drawing, this supporting frame cover 550 is configured so as to cover the illumination optical system 100, color separation optical system 200 and relay optical system 220. To the top surface of supporting frame cover 550 are attached three mirror adjustment mechanisms 204AD, 208AD, 228AD for adjusting the angle of three mirrors 204, 208, 228 arranged in closest proximity to the three liquid crystal light valves 300R, 300G, 300B.

Figure 11:
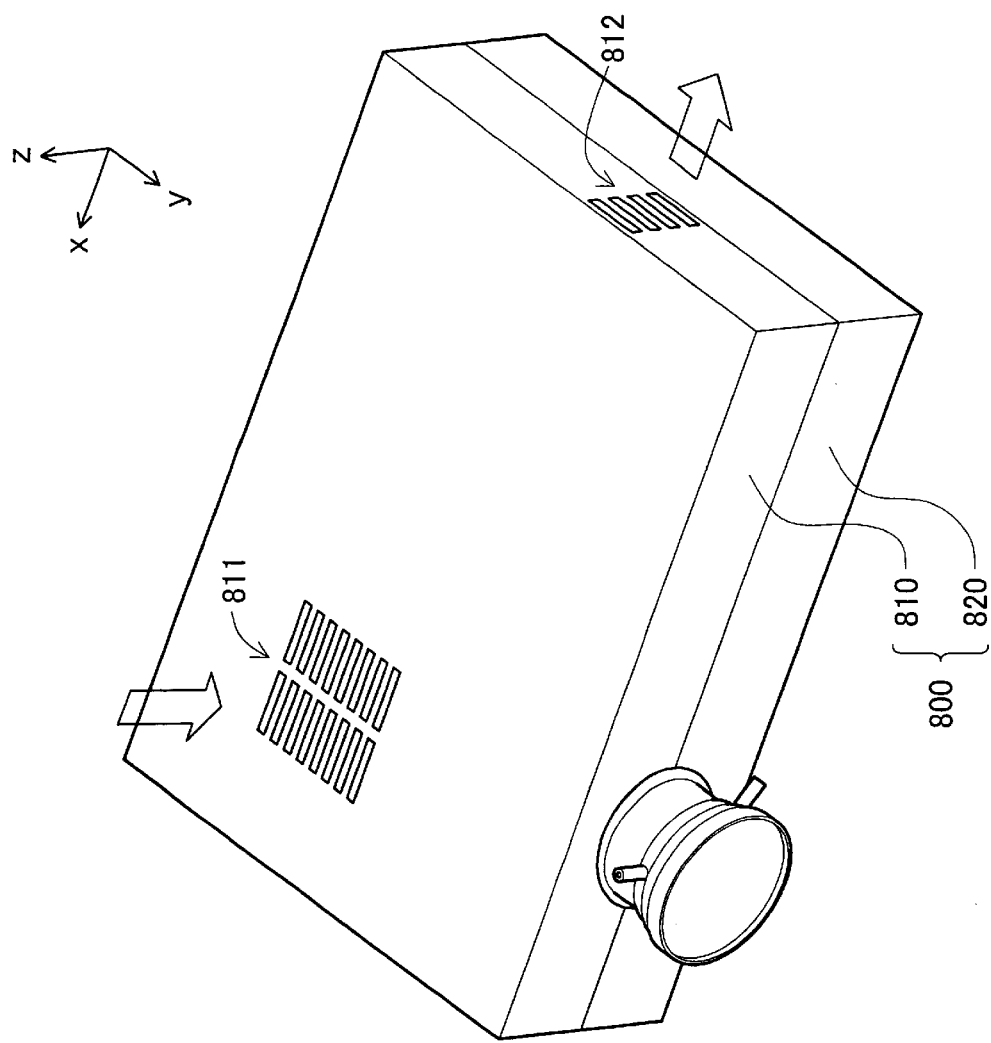
FIG. 11 is an illustrative diagram showing the exterior of the chassis 800.

As shown in FIG. 9 and FIG. 10, once the optical components of the projector have been mounted in the supporting frame 500, it is housed in a chassis. FIG. 11 is an illustrative diagram showing the exterior of the chassis 800. Chassis 800 is composed of an upper chassis 810 and a lower chassis 820. Two groups of slits 811, 812 are provided on the upper chassis 810.

Figure 12:
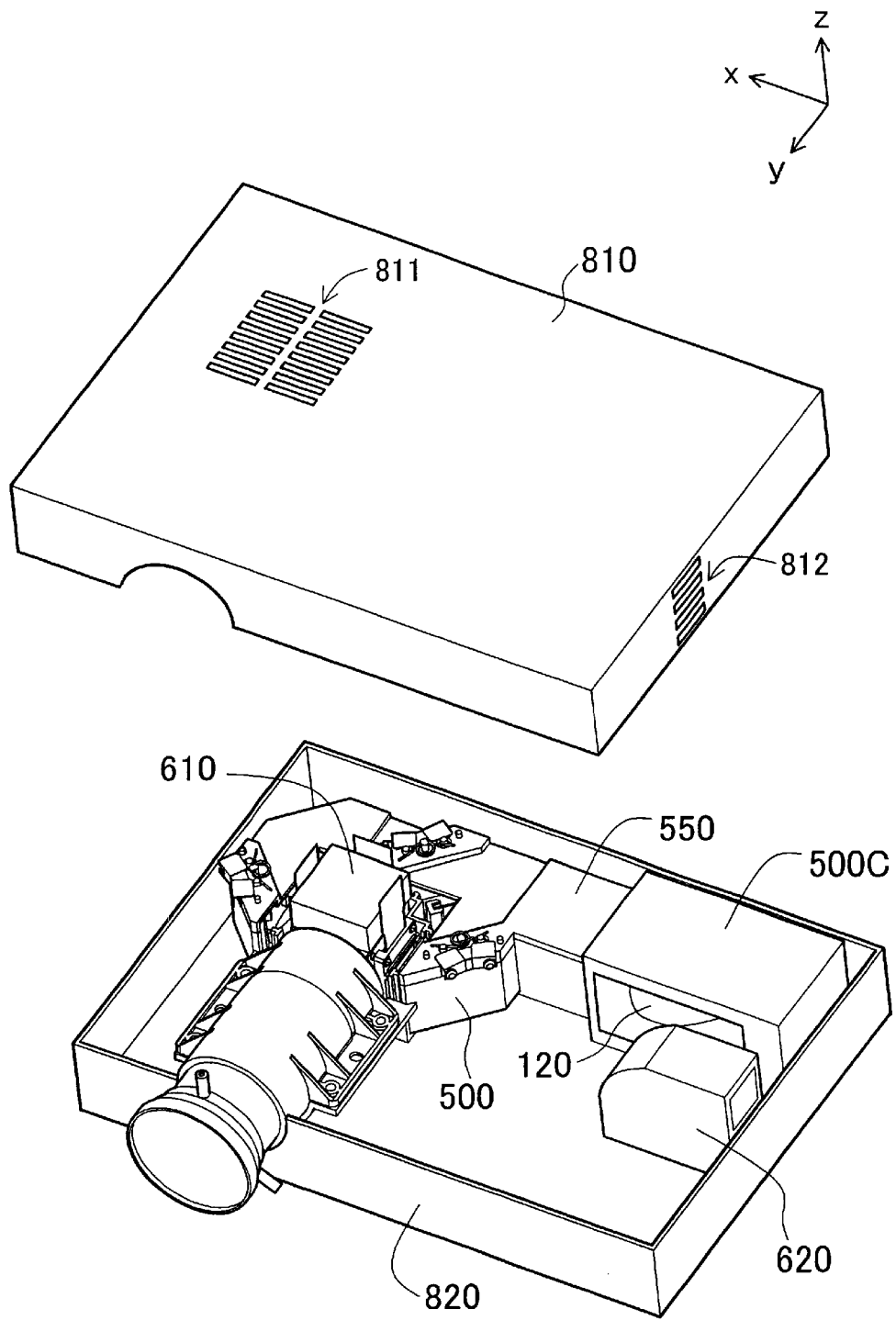
FIG. 12 is an illustrative diagram showing the interior of chassis 800.

FIG. 12 is an illustrative diagram showing the interior of chassis 800. Chassis 800 houses the supporting frame 500 and two cooling fans 610, 620. In actual practice, chassis 800 will also house a power supply for the light source device 120 and for liquid crystal light valves 300R, 300G, 300B etc., as well as controllers for controlling these components.

The first cooling fan 610 is arranged above the cross dichroic prism 360 (FIG. 10). This first cooling fan 610 is an axial fan for creating an air flow from the outside to the interior of chassis 800 via the first group of slits 811 provided to the upper chassis 810. The second cooling fan 620 is arranged adjacent to the case 500C in which the light source device 120 is installed. This second cooling fan 620 is a sirocco fan for creating an air flow from the interior to the outside of chassis 800 via the second group of slits 812 provided to the upper chassis 810. Thus, as depicted in FIG. 11 air drawn in from the outside by the first cooling fan 610 is subsequently expelled to the outside by the second cooling fan 620.

Figure 13:
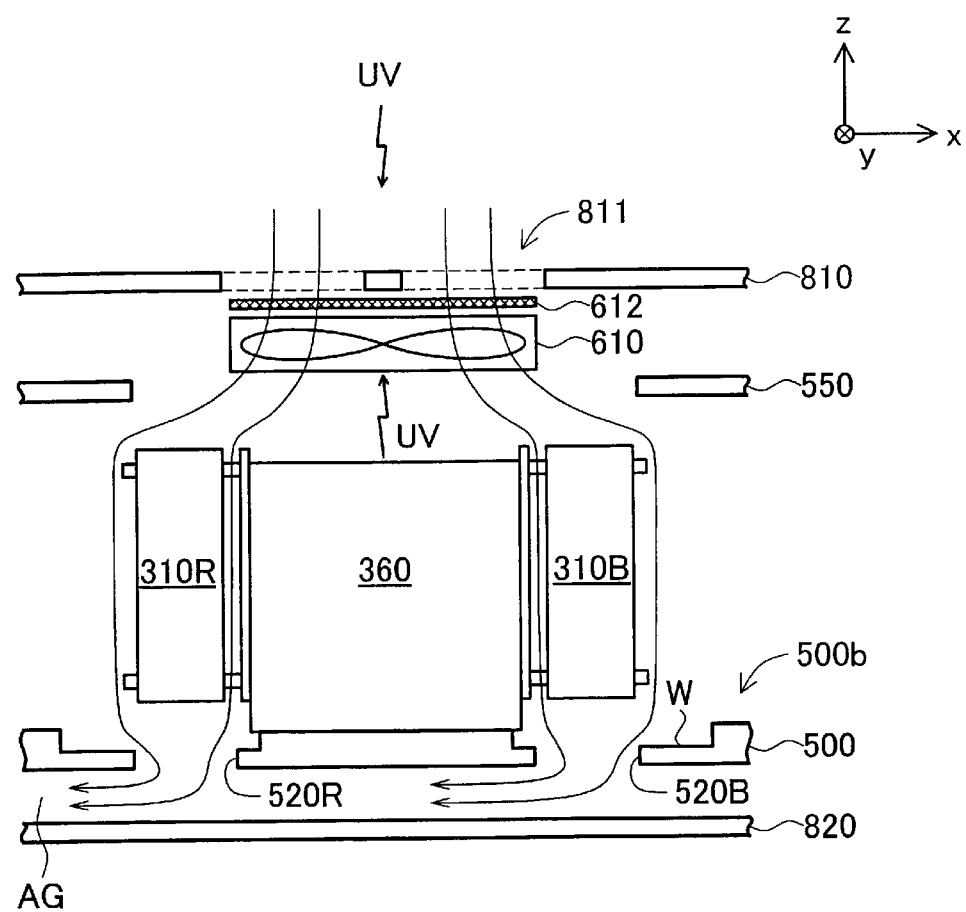
FIG. 13 is an illustrative diagram showing the area around the first cooling fan 610 depicted in FIG. 12.

FIG. 13 is an illustrative diagram showing the area around the first cooling fan 610 depicted in FIG. 12. It should be noted that FIG. 13 is a simplified sectional view showing the area around the first group of slits 811 depicted in FIG. 11, taken in a plane parallel to the x-z plane. The cross dichroic prism 360 is mounted on the mounting stage 510 (FIG. 8) provided on the floor 500b of the supporting frame 500. At the sides of the cross dichroic prism 360, the three liquid crystal panels 310R, 310G, 310B are secured at a predetermined distance away from it, by means of retaining members. The first cooling fan 610 is arranged above the cross dichroic prism 360, secured by means of other retaining members (not shown).

Air drawn in by the first cooling fan 610 passes around the cross dichroic prism 360 and is sucked into openings 520R, 520G, 520B (FIG. 8) provided in the floor 500b of the supporting frame 500. At this time, the liquid crystal panels 310R, 310G, 310B are air-cooled. The air sucked into openings 520R, 520G, 520B is directed to an air flow channel AG provided at the bottom of the supporting frame 500, and expelled by the second cooling fan 620.

In this way, when air currents pass in proximity to the surfaces of the liquid crystal panels 310R, 310G, 310B the liquid crystal panel surfaces tend to become statically charged. However, as described with reference to FIG. 5 and FIG. 6, the presence of the light transmissive films TF on the surfaces of liquid crystal panels 310R, 310G, 310B afford reduced soiling of the liquid crystal panel surfaces.

Figure 14:
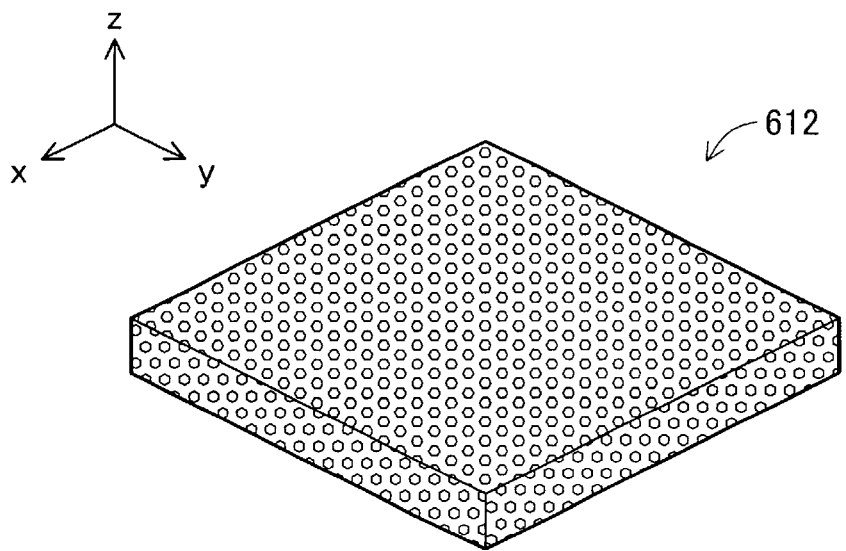
FIG. 14 is an illustrative diagram showing an enlarged view of the filter 612 depicted in FIG. 13.

In this embodiment, the air intake of the first cooling fan 610 is provided with a filter 612 for preventing airborne dust particles outside the chassis 800 from being drawn into the interior. A filter 612 may be provided to the outlet of the first cooling fan 610 as well. FIG. 14 is an illustrative diagram showing an enlarged view of the filter 612 depicted in FIG. 13. Filter 612 is a porous sponge filter of polyurethane.

By the way, when projector 1000 is used for an extended period, the holes in filter 612 may become clogged. Clogging of the holes of filter 612 makes it difficult to efficiently cool the interior of the chassis 800.

In this embodiment, a photocatalyst is affixed to the polyurethane filter 612. As shown in FIG. 13, light having a specific wavelength (typically ultraviolet UV) for activating the photocatalyst affixed to filter 612 is supplied from the inside and outside of chassis 800. That is, a portion of the ultraviolet entering on cross dichroic prism 360 undergoes scattered reflection at the cross dichroic prism 360 surfaces and "X" interface. Accordingly the filter 612 is illuminated with ultraviolet from the chassis 800 interior. The filter 612 is also illuminated from the outside with ultraviolet contained in ambient light, via the first slit group 811 of the upper chassis 810.

In this embodiment, the photocatalyst is affixed to the filter 612 by means of a dipping process. Specifically, the filter is dipped in a solution containing an inorganic adhesive composed of inorganic material, and is then dried at relatively low temperature. The filter having an adhesive film formed thereon is then dipped in a solution containing a photocatalyst, and is then dried at relatively low temperature to affix the catalyst. By affixing the photocatalyst to the filter via a film composed of inorganic material, even if the filter is composed of organic matter (such as polyurethane) decomposition of the organic matter by the photocatalyst can be prevented. By admixing an adsorbent (e.g. activated carbon or zeolite) into the adhesive solution, a deodorizing function may be imparted to the filter. By using a solution containing anatase type titanium oxide as the photocatalyst solution, the filter may be imparted with relatively high photocatalytic function.

By affixing a photocatalyst to the filter 612 in this way, it is possible to reduce clogging of the holes throughout the porous filter 612. Accordingly it is possible to efficiently cool the interior of the chassis 800. In the prior art, cooling fan speed was set such that the interior of the chassis 800 could be cooled even when the filter became clogged, but the use of the filter of this embodiment allows cooling fan speed to be set relatively low. Lower cooling fan speed makes it possible to silence the projector.

As noted, in this embodiment the photocatalyst is affixed to filter 612 by means of a dipping process, but could be affixed by means of a spray process. Specifically, a solution containing an inorganic adhesive composed of inorganic material is sprayed onto the surface of the filter, which is then dried at relatively low temperature. Next, a solution containing a photocatalyst is sprayed onto the surface of the filter having an adhesive film formed thereon, and then dried at relatively low temperature to affix the catalyst. By so doing it is possible to efficiently reduce clogging of the holes on the surface of the filter 612, which has a relatively high likelihood of clogging.

Figure 15:
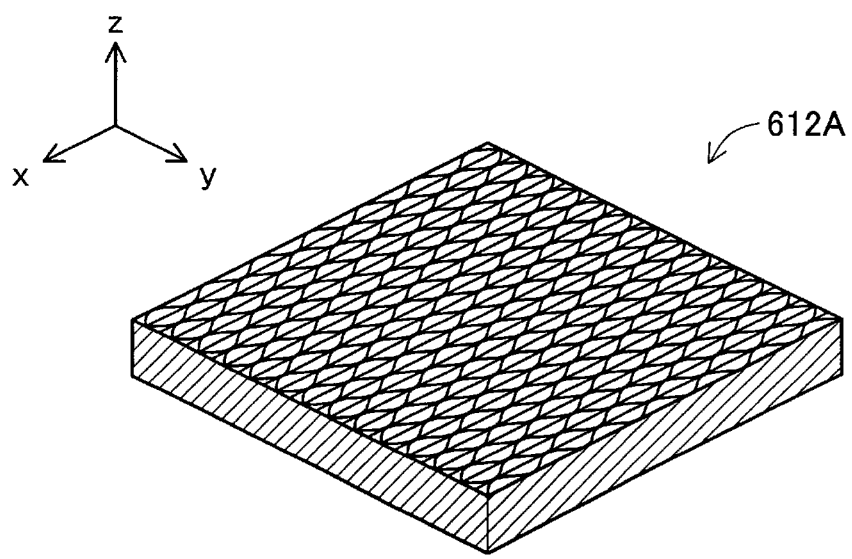
FIG. 15 is an illustrative diagram of a modification of the filter 612 depicted in FIG. 14.

In this embodiment, a sponge polyurethane filter 612 is used, but other filters could be used as well. FIG. 15 is an illustrative diagram of a modification of the filter 612 depicted in FIG. 14. This filter 612A is a corrugated metal filter 612A having a plurality of relatively large holes. The metal filter 612A is produced by stacking flat metal sheet and corrugated metal sheet in sequence. For example, aluminum or copper sheet having thickness of about 15 $\mu$m can be used as the metal sheet. Where a metal filter 612A is used, hole size can be set relatively large. For example, the maximum distance between any two points on the contour line dividing the holes can be set about 0.3 mm or above. The relatively large size of the holes makes it possible to achieve relatively high air passage.

Even where the metal filter 612A depicted in FIG. 15 is used it is preferable to affix a photocatalyst to the filter 612A. Where the adhesive in the bonding portions of the flat metal sheet and corrugated metal sheet is susceptible to being decomposed by the photocatalyst, it is desirable to interpose a film composed of inorganic material before affixing the photocatalyst.

Where the metal filter 612A depicted in FIG. 15 is used, it may occur that light inside the chassis 800 may leak to the outside via the plurality of holes in the metal filter 612A and the first slit group 811 in the upper chassis 810, and fall upon the presenter etc. This is because the holes in the metal filter 612A are arranged within chassis 800 extending in the Z direction in FIG. 12. In such cases, it is preferably to use a metal filter wherein the direction of hole extension is offset by a small angle with respect to the Z-direction in chassis 800.

While in FIG. 15 a corrugated metal filter 612A is used, a metal filter of matrix or honeycomb configuration could be used instead.

As noted, the projector 1000 of this embodiment comprises: a chassis 800 for housing a plurality of optical components arranged on the optical path going from the illumination optical system 100 to the projection optical system 380; and cooling fans 610, 620 for cooling the interior of chassis 800. A filter 612, 612A having a photocatalyst affixed thereto is provided at the intake of the first cooling fan 610. By so doing, penetration of dust into the chassis interior can be reduced, so soiling of the surfaces of optical components can be reduced. Further, since the photocatalyst affixed to the filter decomposes dust adhering to the filter, dust adhering to the filter can be cleared. As a result, clogging of the filter 612, 612A can be reduced so that the interior of the chassis 800 can be cooled efficiently by the cooling fan 610.

In this embodiment, a filter 612 having a photocatalyst affixed thereto is provided to the ventilation passage of the first cooling fan 610; however, a filter having a photocatalyst affixed thereto could be provided to the ventilation passage of the second cooling fan 620. Where a filter is provided at the air intake of the second cooling fan 620, ultraviolet light for activating the photocatalyst is supplied by the reflector 124 of the light source device 120. Specifically, the reflector 124 of this embodiment is made by forming a reflective film on the concave surface of hard glass. Thus, a portion of the ultraviolet passes through the reflective film, so that the filter arranged at the ventilation passage of the second cooling fan 620 is illuminated with ultraviolet. Where a filter is provided at the outlet of the second cooling fan 620, on the other hand, ultraviolet light for activating the photocatalyst is supplied from the outside of chassis 800, via the second slit group 812 of the upper chassis 810.

In general, a filter having a semiconductor photocatalyst affixed thereto will be arranged at ventilation passage of the cooling fan.

The invention is not limited to the examples and embodiments set forth hereinabove, various modifications thereof being possible without departing from the scope and spirit of the invention. Modifications such as the following are possible, for example.

(1) In the preceding embodiments, each liquid crystal panels 310R, 310G, 310B comprises a pair of glass substrates 301, 302, but in some instances an additional glass substrate (also termed an "anti-dust glass substrate") is affixed on glass substrates 301, 302. In this case, a light transmissive film TF can be formed on this additional glass substrate. Where an additional glass substrate is not affixed, as in the above example, a resultant advantage is that the temperature rise of the liquid crystal panels can be kept relatively small.

(2) In the preceding embodiments, light transmissive film TF including a semiconductor photocatalyst film PCF and an antistatic film ASF is formed on the pair of glass substrates 301, 302 which constitute the surfaces of the liquid crystal panels 310R, 310G, 310B, but light transmissive films TF could be formed on other optical components as well. For example, light transmissive films TF could be formed on the optical components constituting the illumination optical system 100, color separation optical system 200, relay optical system 220 or projection optical system 380. Also, it could be formed on the field lenses 232, 234 or cross dichroic prism 360, etc. Further, light transmissive films TF may be formed on optical components not applied to a projector.

Where a light transmissive film TF is formed on an optical component, the light transmissive film TF will preferably be formed at least in the region of the incident light predicted to enter the optical component. By so doing the area covered by the light transmissive film can be made relatively small, thereby making the optical component easier to fabricate.

(3) In the preceding embodiments, the semiconductor photocatalyst film PFC contains titanium oxide ($TiO_2$), but could instead contain strontium titanate ($SrTiO_3$), potassium niobate ($KNbO_3$) etc. However, where the semiconductor photocatalyst film PFC contains titanium oxide ($TiO_2$), the soiling of the surface of an optical component can be more efficiently reduced than the case where a semiconductor photocatalyst film contains other materials.

In the preceding embodiments, a layer formed of ITO is used as a transparent conducting layer included in the antistatic film ASF, but one could form a transparent conducting layer from other materials, for example, tin antimony oxide ($SnO_2+Sb_2O_3$), ZAO (zinc aluminum oxide: $ZnO+Al_2O_3$) etc. In the preceding embodiments, the antistatic film ASF is composed of four layers L1–L4, but could instead be composed of at least one layer.

Where the surfaces of a light transmissive member included in an optical component are formed of plastic or other organic matter, the light transmissive film will preferably include an inorganic material layer (e.g. an $SiO_2$ layer) at the interface thereof with the light transmissive member. This prevents the organic matter from being decomposed by activation of the photocatalyst.

In general, an optical component will comprise a light transmissive member, and a light transmissive film formed on the light transmissive member, wherein the light transmissive film will comprise a semiconductor photocatalyst film constituting the outside surface of the optical component, and an antistatic film formed between the semiconductor photocatalyst film and the light transmissive member.

(4) In the preceding embodiments, the illumination optical system comprises a light source device 120 including a high-pressure mercury lamp 122, but a light source device 120 including a metal halide lamp etc. could be used instead.

In general, an illumination optical system will comprise a light source device for emitting light that includes a light component having a predetermined wavelength capable of activating the semiconductor photocatalyst.

(5) In the preceding embodiments, the projector 1000 comprises transmissive-type liquid crystal panels, but could instead comprise reflective-type liquid crystal panels.

In the preceding embodiments, the projector 1000 comprises liquid crystal panels, but could instead comprise a micromirror type light modulating device, high-luminance CRT, etc. A DMD (Digital Micromirror Device, trade mark of TI corp.) could be used as the micromirror type light modulating device.

In general, a projector will comprise an electro-optical device for modulating light from the illumination optical system in response to image information.

(6) In the preceding embodiments, the example of a projector 1000 for displaying a color image is described, but the invention may be reduced to practice analogously in a projector for displaying a monochrome image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical component comprising:
   a light transmissive member; and
   a light transmissive film formed on the light transmissive member;
   wherein the light transmissive film comprises:
      a semiconductor photocatalyst film constituting an outside surface of the optical component; and
      an antistatic film formed between the semiconductor photocatalyst film and the light transmissive member.

2. The optical component according to claim 1, wherein the semiconductor photocatalyst film contains $TiO_2$.

3. The optical component according to claim 2, wherein the $TiO_2$ is of anatase crystalline form.

4. The optical component according to claim 1, wherein the antistatic film has surface resistivity of less than about $1.0 \times 10^{10} \Omega$.

5. The optical component according to claim 4, wherein the semiconductor photocatalyst film is formed on the antistatic film, and the antistatic film includes an $SiO_2$ layer situated at an interface thereof with the semiconductor photocatalyst film.

6. The optical component according to claim 4, wherein the antistatic film includes a transparent conductive layer.

7. The optical component according to claim 1, wherein the light transmissive film is formed at least in a specific region on which particular light designed to enter the optical component is to be incident.

8. A projector for projecting and displaying of an image, comprising:
   an illumination optical system;
   an electro-optical device for modulating light from the illuminating optical system in response to image information; and
   a projection optical system for projecting the modulated light from the electro-optical device;
   wherein at least one of a plurality of optical components arranged on the optical path from the illumination optical system to the projection optical system comprises:

a light transmissive member; and a light transmissive film formed on the light transmissive member;

and wherein the light transmissive film comprises:

a semiconductor photocatalyst film constituting an outside surface of the optical component; and an antistatic film formed between the semiconductor photocatalyst film and the light transmissive member.

9. The projector according to claim 8, wherein the semiconductor photocatalyst film contains $TiO_2$.

10. The projector according to claim 9, wherein the $TiO_2$ is of anatase crystalline form.

11. The projector according to claim 8, wherein the antistatic film has surface resistivity of less than about $1.0 \times 10^{10}$ Ω.

12. The projector according to claim 11, wherein the semiconductor photocatalyst film is formed on the antistatic film, and the antistatic film includes an $SiO_2$ layer situated at an interface thereof with the semiconductor photocatalyst film.

13. The projector according to claim 11, wherein the antistatic film includes a transparent conductive layer.

14. The projector according to claim 8, wherein the light transmissive film is formed at least in a specific region on which particular light designed to enter the optical component is to be incident.

15. The projector according to claim 8, wherein the illumination optical system includes a light source device for emitting light that includes a light component having a predetermined wavelength capable of activating the semiconductor photocatalyst film.

16. The projector according to claim 15, wherein the electro-optical device is said optical component.

17. The projector according to claim 16, further comprising:

an chassis for accommodating the plurality of optical components arranged on the optical path from the illumination optical system to the projection optical system; and at least one cooling fan for cooling interior of the chassis.

18. The projector according to claim 17, further comprising:

a filter having a semiconductor photocatalyst affixed thereto, arranged at ventilation passage of the cooling fan.

19. A projector for projecting and displaying of a color image, comprising:

an illumination optical system;

a color separation optical system for separating light emitted from the illumination optical system into first through third colored lights;

first through third electro-optical devices for modulating the first through third colored lights in response to image information to generate first through third modulated lights;

a color combination optical system for combining the first through third modulated lights; and a projection optical system for projecting the composite light from the color combination optical system;

wherein at least one of a plurality of optical components arranged on the optical path from the illumination optical system to the projection optical system comprises:

a light transmissive member; and a light transmissive film formed on the light transmissive member;

and wherein the light transmissive film comprises:

a semiconductor photocatalyst film constituting an outside surface of the optical component; and an antistatic film formed between the semiconductor photocatalyst film and the light transmissive member.

20. The projector according to claim 19, wherein the semiconductor photocatalyst film contains $TiO_2$.

21. The projector according to claim 20, wherein the $TiO_2$ is of anatase crystalline form.

22. The projector according to claim 19, wherein the antistatic film has surface resistivity of less than about $1.0 \times 10^{10}$Ω.

23. The projector according to claim 22, wherein the semiconductor photocatalyst film is formed on the antistatic film, and the antistatic film includes an $SiO_2$ layer situated at an interface thereof with the semiconductor photocatalyst film.

24. The projector according to claim 22, wherein the antistatic film includes a transparent conductive layer.

25. The projector according to claim 19, wherein the light transmissive film is formed at least in a specific region on which particular light designed to enter the optical component is to be incident.

26. The projector according to claim 19, wherein the illumination optical system includes a light source device for emitting light that includes a light component having a predetermined wavelength capable of activating the semiconductor photocatalyst film.

27. The projector according to claim 26, wherein the first through third electro-optical devices are said optical components, and the color separation optical system emits the first through third colored lights that include a light component having a predetermined wavelength emitted from the light source device.

* * * * *